United States Patent
Yeh et al.

(10) Patent No.: US 7,887,019 B2
(45) Date of Patent: Feb. 15, 2011

(54) SUPPORT MECHANISM

(75) Inventors: Ming Te Yeh, Kuang-Ln (TW);
Chien-Chung Tseng, Kuang-Ln (TW)

(73) Assignee: Teco Image System Co., Ltd, Taipei (TW)

( * ) Notice: Subject to any disclaimer, the term of this patent is extended or adjusted under 35 U.S.C. 154(b) by 855 days.

(21) Appl. No.: 11/676,212

(22) Filed: Feb. 16, 2007

(65) Prior Publication Data

US 2008/0135716 A1    Jun. 12, 2008

(30) Foreign Application Priority Data

Dec. 6, 2006    (TW) ............................... 95145491 A (51) Int. Cl.
*A47G 29/00*    (2006.01)
(52) U.S. Cl. .............................. 248/372.1; 248/292.13; 248/597; 248/274.1; 16/340; 16/308; 16/337
(58) Field of Classification Search ................ 248/597, 248/560, 576, 577, 578, 590, 624, 220.21, 248/274.1, 598, 166, 440, 346.04, 292.13, 248/923, 133, 371, 372.1, 398; 16/221, 304, 16/305, 306, 308, 337, 335, 340, 348
See application file for complete search history.

(56) References Cited

U.S. PATENT DOCUMENTS 5,219,240 A * 6/1993 Kitamura ..................... 403/84
6,609,272 B1 * 8/2003 Lee ............................... 16/307
7,421,762 B2 * 9/2008 Lu et al. ........................ 16/328
7,513,011 B2 * 4/2009 Lu et al. ........................ 16/337
7,614,594 B2 * 11/2009 Baek et al. ............... 248/274.1
2004/0055114 A1 * 3/2004 Lu ................................ 16/340
2005/0108854 A1 * 5/2005 Lee et al. ....................... 16/340

FOREIGN PATENT DOCUMENTS

| JP | 44-007605 B   | 3/1969 |
| JP | H03-074626 A1 | 3/1991 |
| JP | 2004-003594 A1 | 1/2004 |

* cited by examiner

*Primary Examiner*—Terrell Mckinnon
*Assistant Examiner*—Todd M. Epps
(74) *Attorney, Agent, or Firm*—Rabin & Berdo, P.C.

(57) ABSTRACT

A support mechanism is adapted to support an upper body of an electronic element, and the upper body can be turned pivotally relative to a lower body of the electronic device. The support mechanism includes a base, a plate, a transmission shaft and a torsional force generating device, in which the base is fixed on the lower body and the plate is fixed on the upper body. Furthermore, the transmission shaft is passed through and installed on the base and the torsional force generating device is wound around the transmission shaft. One end of the torsional force generating device is extended outward and fixed on the plate so as to couple the base to the plate and process a pivotal turn.

19 Claims, 11 Drawing Sheets

SUPPORT MECHANISM

CROSS-REFERENCES TO RELATED APPLICATIONS

This non-provisional application claims priority under 35 U.S.C. §119(a) on Patent Application No(s). 95145491 filed in Taiwan, R.O.C. on Dec. 6, 2006 the entire contents of which are hereby incorporated by reference.

BACKGROUND OF THE INVENTION

1. Field of the Invention

The present invention relates to a support mechanism, and more particularly to a support mechanism allowing an upper body and lower body of an electronic device to be pivotally turned relatively.

2. Description of Related Art

Accompanying the development of a machine with multiple functions, more and more business machines have functions such as facsimile, scanning, Xerox and printing concurrently; this allows not only the business machine to provide with multiple word processing capabilities, but also the volume thereof to become more light and handy. Besides, the assembly procedures for the business machine are simple, only telephone line, web line and power source line need to be connected thereto, it can then be collocated with a computer to use so that the business machine become more popular.

A general business machine includes an infrared image input device (IR image input device) and automatic document feeder (ADF). When an engine of the business machine needs to be maintained, the IR image input device and the ADF must be pulled up. But, because the IR image input device and the ASF have a certain extent of weight, a hinge or lever mechanism installed in the conventional business machine is unable to support the IR image input device and the ADF stably. This causes not only the IR image input device and the ADF to be dropped easily, but also a maintenance personnel to be damaged.

Figure 1:
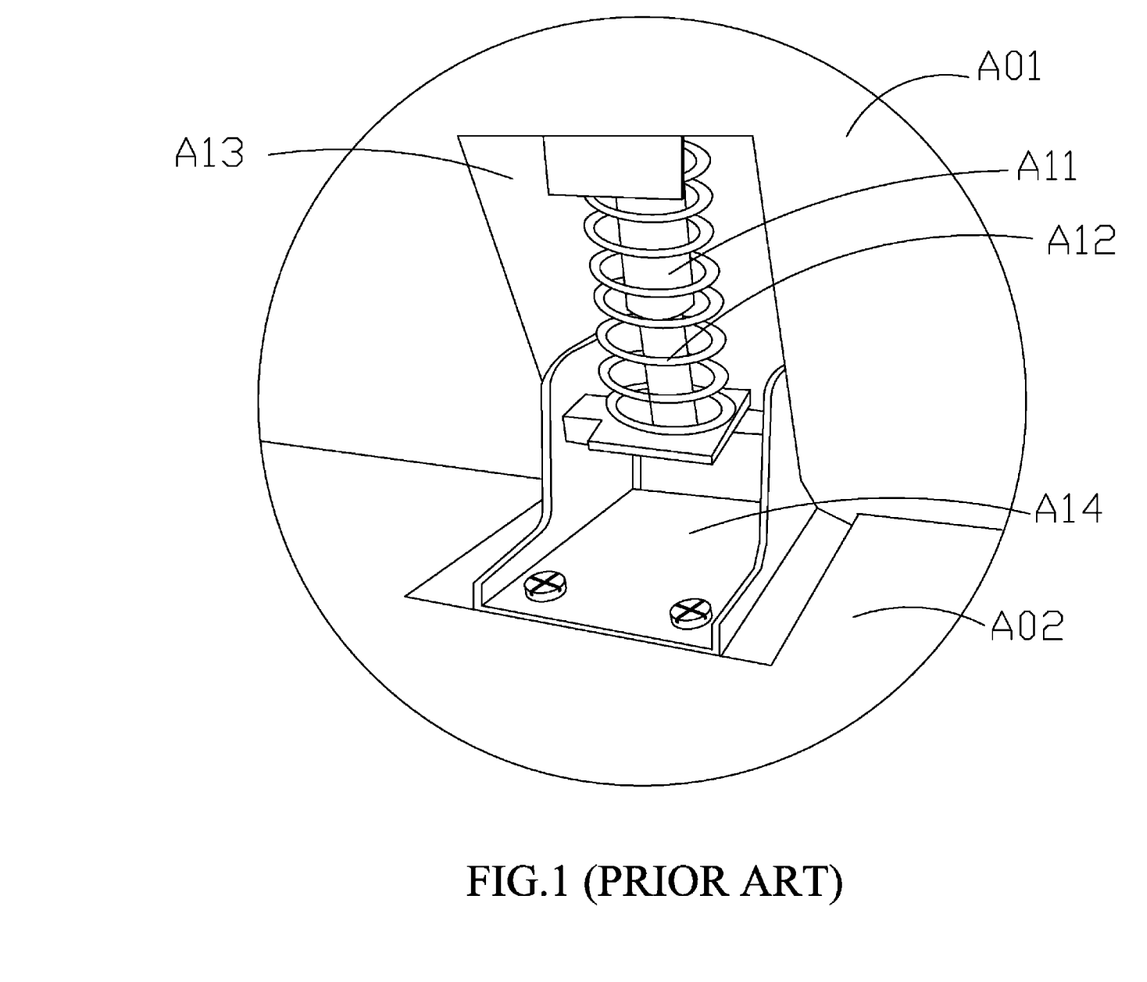
FIG. 1 is a schematic view of a conventional support mechanism of a business machine.

Please refer to FIG. 1. A conventional business machine includes an upper body A01 and a lower body A02, in which a hinge element A11 is installed between the upper body A01 and the lower body A02. Furthermore, a spring A12 is looped around the hinge element A11; one end of the hinge element A11 is fixed on an upper cover plate A13 and another end thereof is then fixed on a lower cover plate A14. When the upper body A01 of the business machine is opened upward or closed downward, the lengths of both hinge element A11 and the spring A12 are extended or shrunk, and a resist torsional force is generated to support the weight of the upper body A01 along a opening or closing angle of the upper body A01. Because the volume of the business machine is gradually shrunk, the dimensions of the hinge element A11 and the spring A12 must also be shrunk as the volume of the business machine such that the dimension of the resist torsional force is limited. When the resist torsional force is unable to support the weight of the upper body A01, it will cause the whole upper body A01 to be dropped down to generate a strong striking force to electronic elements therein and also to endanger the safety of maintenance personnel.

Therefore, for being assure of the stability in the process of the opening and the closing of the upper body of the electronic device and decreasing the number of components of the support structure so as to shrink space occupied by the support structure and further to attain to the object of the production cost reduction, the present invention is proposed.

SUMMARY OF THE INVENTION

For improving the deficits mentioned above, the present invention propose a support mechanism adapted to support an upper body of an electronic device, and here, the upper body here can be pivotally turned relatively to a lower body of the electronic device. The support mechanics includes a base fixed on the lower body, a plate fixed on the upper body, a transmission shaft passed through the base and used for coupling to the plate and allowing the plate to be pivotally turned relatively to the base, and the torsional force generating device wound around the transmission shaft and having one end thereof being extended outward to fix on the plate. When the plate is turned pivotally upward, the inner side of the torsional force generating device looses the transmission shaft and supports the upper body to be standstill at an arbitrary angle or descend to a positioning point. Therefore, the weight of the upper body is used to cause the inner side of the torsional force generating device to bind up the transmission shaft and generate a torsional force so as to support the upper body of the electronic device.

Furthermore, the inner side of the torsional force generating device looses the transmission shaft to allow the plate to be turned pivotally upward, and when the plate is turned pivotally relatively to the base, the transmission shaft is fixed on the lower body and the torsional force generating device is turned pivotally with the plate.

The support mechanism according to the present invention further includes a locking element, and a loop portion is formed at one end of the torsional force generating device by means of winding. Putting the loop porting around the locking element allows one end of the torsional generating device to be fixed on the plate.

Besides, the plate includes a positioning portion, and a looping portion is formed at one end of the torsional force generating device. Putting the looping portion around the poisoning portion allows one end of the torsional force generating device to be fixed on the plate.

A through hole used for allowing one end of the torsional force generating device to be passed through to wind around can also be disposed on the plate mentioned above so as to enble one end of the torsional force generating device to be fixed on the plate.

Furthermore, the transmission shaft includes a groove used for allowing one portion of the torsional force generating device to be wound around so as to enable so as to generate a reserved stress to enable a spring force capable of separating an upper body from a tenon or clasp when the plate is turned pivotally upward.

The present invention also proposes a support mechanism adapted to support an upper body of an electronic device, and the upper body can be turned pivotally relatively to a lower body of the electronic device, the support mechanism includes a base fixed on the lower body, a plate fixed on the upper body, a transmission passed through and installed on the base and used for coupling the plate to enable the plate to be turned pivotally relatively to the base, and a torsional force generating device with two sides thereof being respectively wound around the transmission shaft and the middle position thereof being extended outward and fixed on the plate. When the plate is turned pivotally upward, the inner side of the torsional force generating device is loosed and separated from the transmission shaft and supports the upper body to be standstill at an arbitrary angle or drops it to a positioning point. Therefore, the weight of the upper body of the upper body is utilized to enable the inner side of the torsional force generating device to bind up the transmission shaft to generate a torsional force so as to support the upper body of the electronic device.

Furthermore, the inner side of the torsional force generating device looses the transmission shaft to allow the plate to be turned pivotally upward, and when the plate is turned pivotally relatively to the base, the transmission shaft is fixed on the lower body and the torsional force generating device is turned pivotally with the plate.

The support mechanism according to the present invention further includes a locking element, and a loop portion is formed at one end of the torsional generating device by means of winding. Putting the loop porting around the locking element allows one end of the torsional generating device to be fixed on the plate.

Besides, the plate includes a positioning portion, and a loop portion is formed at one end of the torsional force generating device. Putting the looping portion around the poisoning portion allows one end of the torsional force generating device to be fixed on the plate.

Furthermore, the transmission shaft includes a groove used for allowing one portion of the torsional force generating device to be wound around so as to generate a reserved stress to enable a spring force to separate an upper body from a tenon or clasp when the plate is turned pivotally upward.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 2:
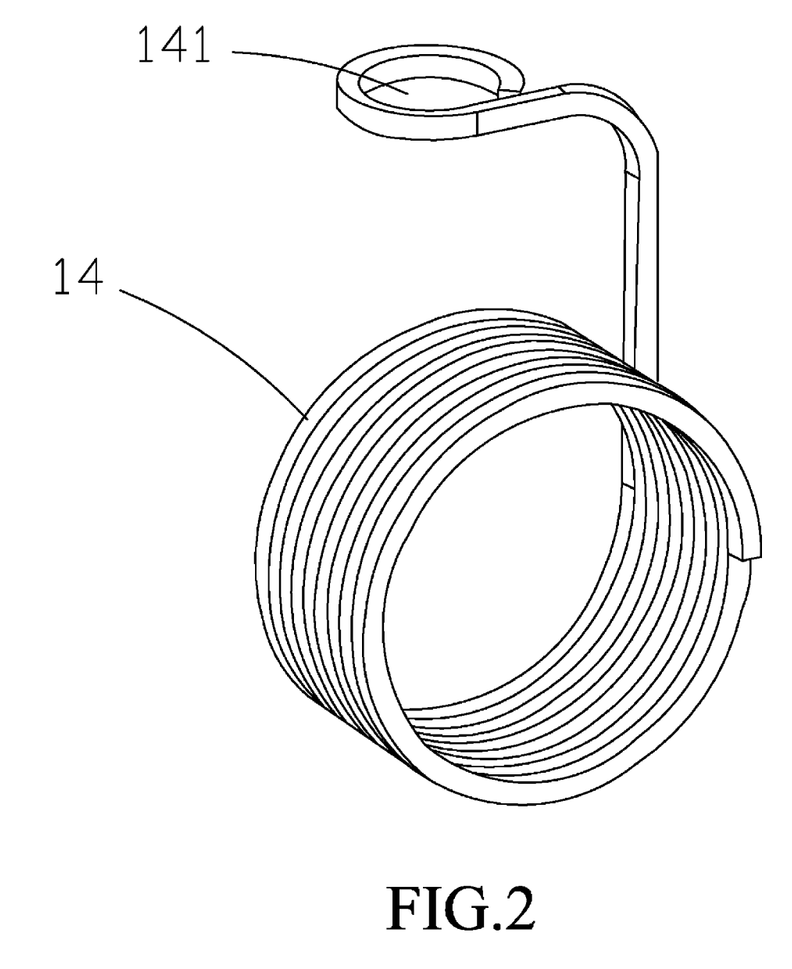
FIG. 2 is a perspective view, showing a torsional force generating device of a first preferred embodiment according to the present invention.
Figure 3A:
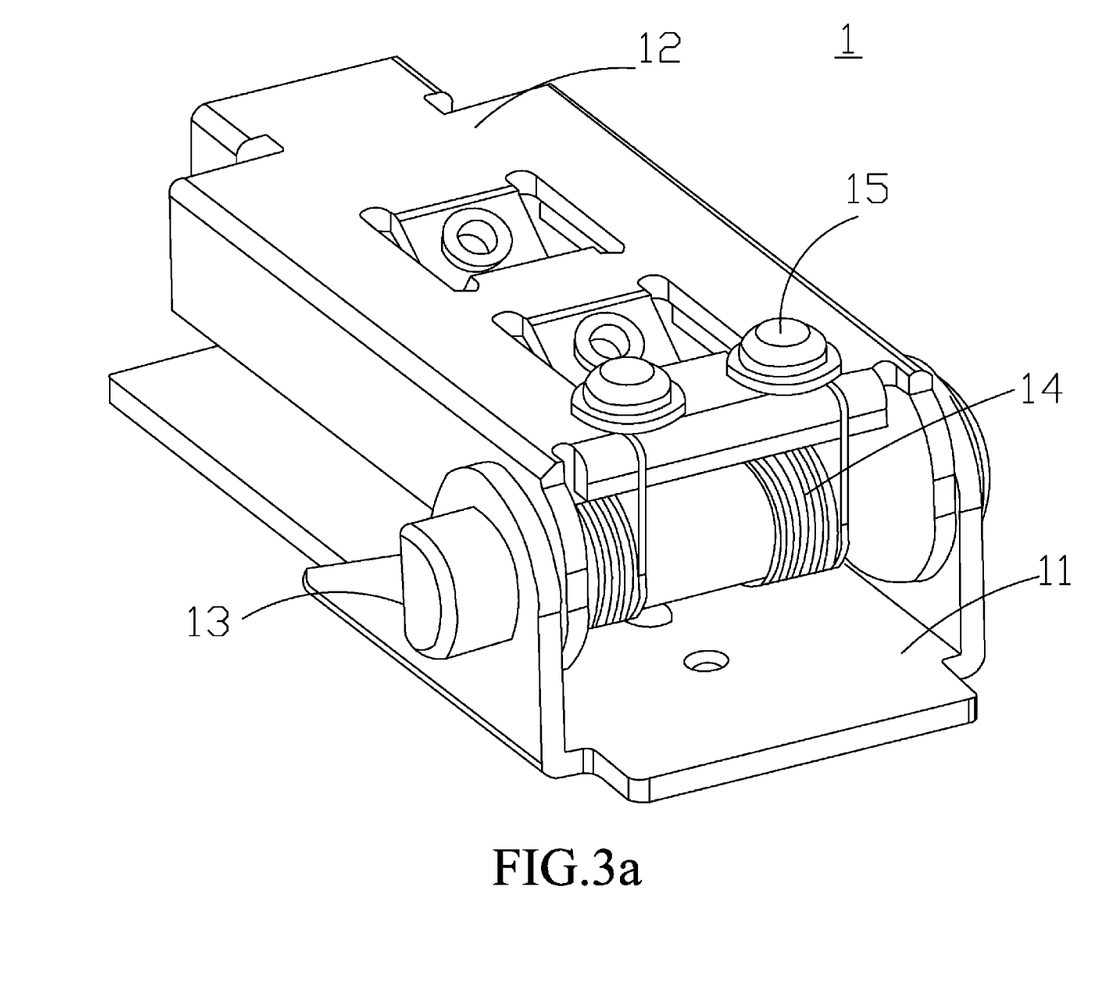
FIG. 3a is a schematic view, showing a support mechanism in a close state of a first preferred embodiment according to the present invention.
Figure 3B:
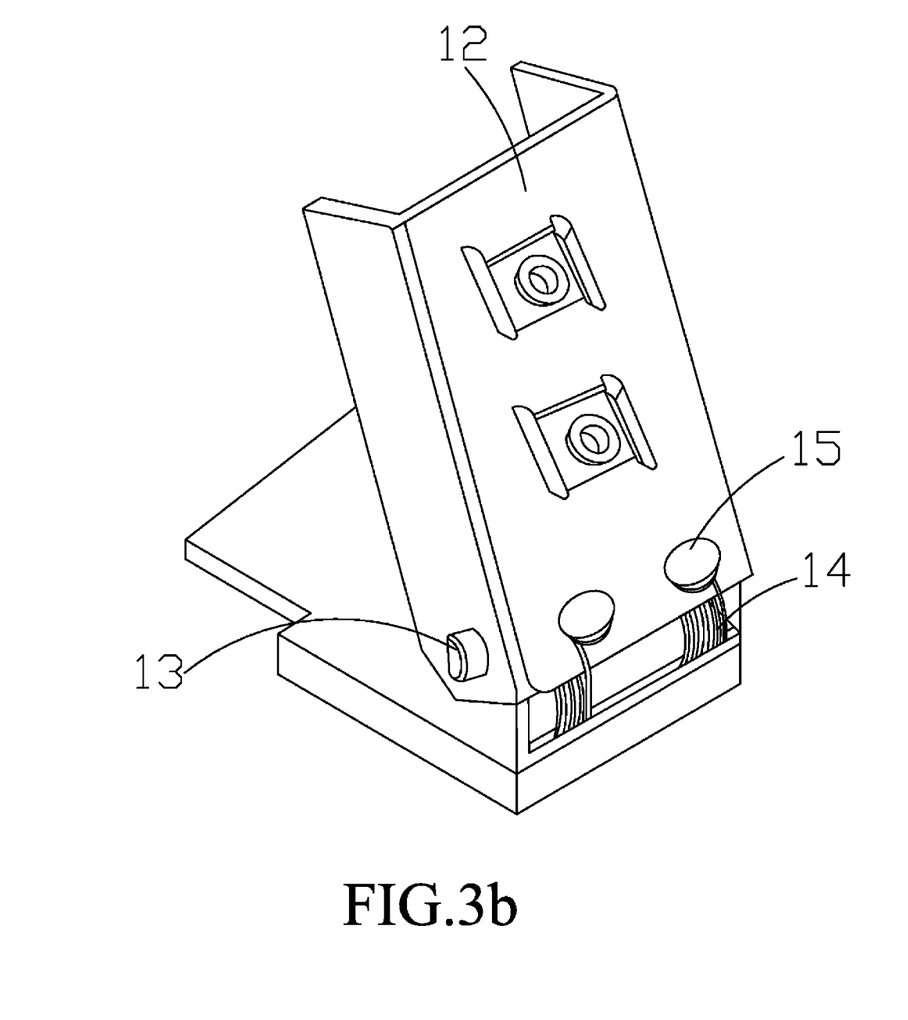
FIG. 3b is a schematic view, showing a support mechanism in an open state of a first preferred embodiment according to the present invention.

Please refer to FIGS. 2, 3a and 3b. The figures show a support mechanism of a preferred embodiment according to the present invention. FIG. 2 is a perspective view showing a torsional force generating device, FIG. 3a is a schematic view of a support mechanism in a closing state and FIG. 3B is a schematic view of a support mechanism in an opening state.

A support mechanism 1 includes a base 11, a plate 12, a transmission shaft 13 and a torsional force generating device 14.

The base 11 is fixed on a lower body of an electronic device.

The plate 12 is fixed on an upper body of the electronic device.

Figure 4A:
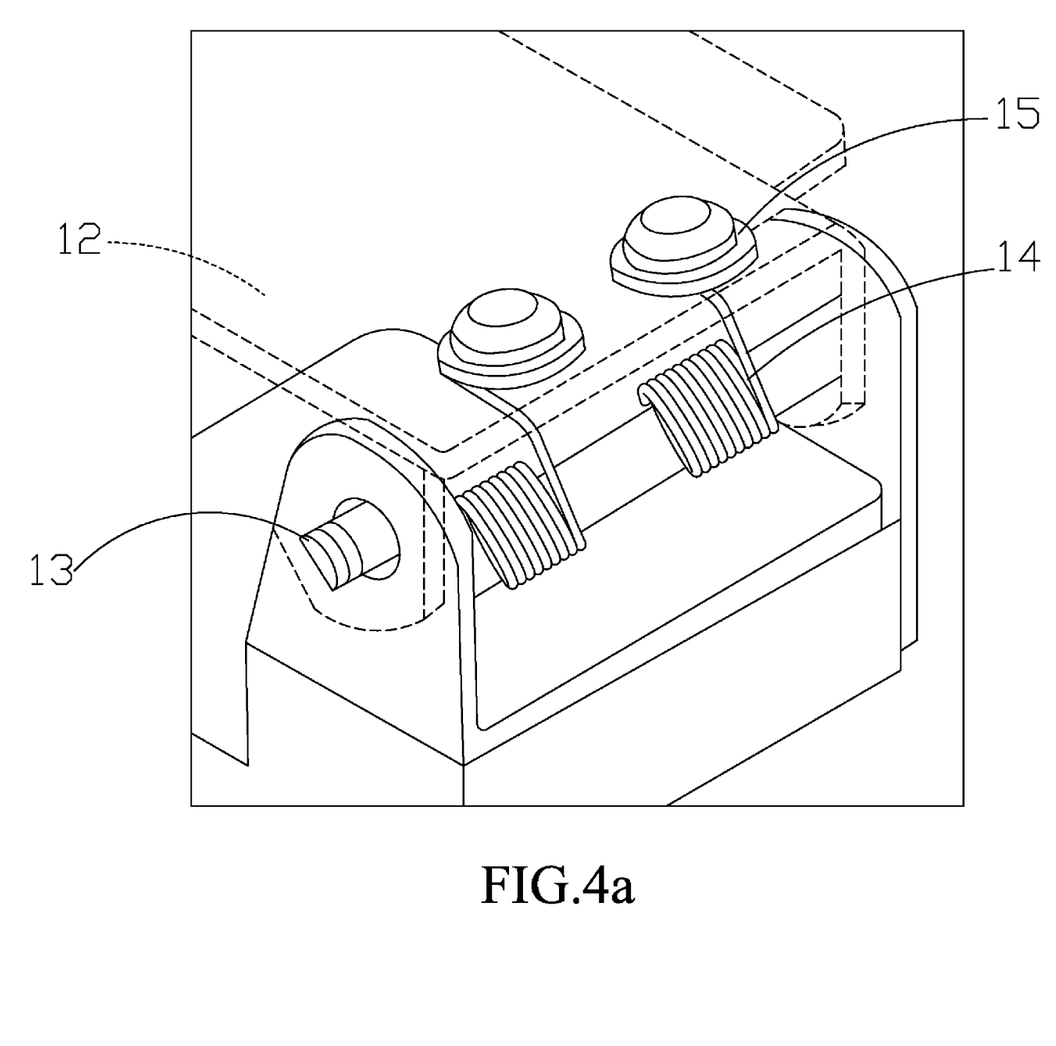
FIG. 4a is a perspective view, showing a torsional force generating device of a first preferred embodiment according to the present invention.

The transmission shaft 13 is passed through and installed on the base 11 and used for coupling to the plate 12 to enable the plate 12 to be turned pivotally relatively to the base 11. As illustrated in FIGS. 3a and 4a, the base 11 has two vertical projections, and the transmission shaft 13 is horizontally installed between the two vertical projections.

One end of the torsional force generating device 14 is wound around the transmission shaft 13 and another end thereof is extended outward and fixed on the plate 12, and the torsional force generating device 14 will bind up the transmission shaft when a forward force is acted on it and will be then loosed and separated from the transmission shaft 13 when a reverse force is acted on it. Furthermore, when the plate 12 is turned pivotally relatively to the base 11, the torsional force generating device 14 is turned pivotally with the plate 12.

The torsional force generating device 14 mentioned above can be a spring, and the upper body of the electronic device can be a usual automatic document feeder (ADF), infra image input device (IR image input device) or dustproof cover.

The structure according to the present invention further includes a locking element 15 locked on the plate 12, and a loop portion 141 is formed at one end of the torsional force generating device 14 by means of winding so as to put the loop portion 141 around the locking element to fix one end of the torsional force generating device 14 on the plate 12.

Figure 4B:
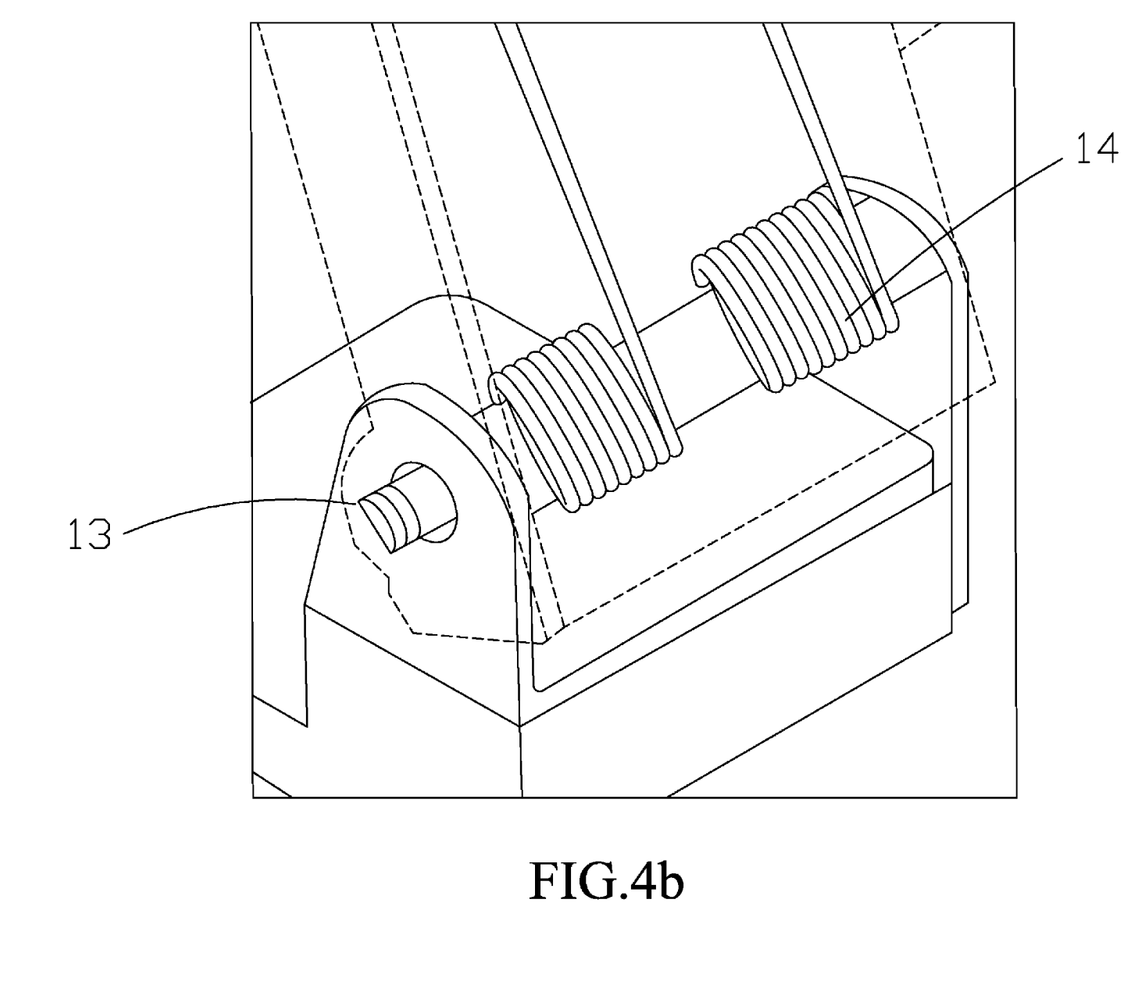
FIG. 4b is a schematic view, showing a support mechanism in a close state of a first preferred embodiment according to the present invention.

Please refer to FIGS. 4a and 4b. FIG. 4a is a perspective view showing a torsional force generating device of a support mechanism of a first preferred embodiment according to the present invention and FIG. 4b is a schematic view showing a support mechanism in a closing state. Because the transmission shaft 13 is installed on the base 11 and two ends thereof are coupled to the plate 12, and the plate 12 can be turned pivotally upward to enable the inner side of the torsional force generating device 14 to be loosed and separated from the transmission shaft 13. Therefore, when a user lifts the upper body of the electronic device, the inner side of the torsional force generating device 14 is loosed and separated from the transmission shaft 13 to enable the plate 12 to be turned pivotally upward relatively to the base 11. When the user stops lifting, the weight of the upper body allows the inner side of the torsional force generating device 14 to bind up the transmission shaft 13 to generate a torsional force so that the upper body of the electronic device is supported stably through the support mechanism 1 to allow the upper body of the electronic device to stop at any angle or descend slowly and not to drop down because the weight is able to be fully supported in the middle of closing or opening when the upper body of the electronic device is rotated relatively to the lower body.

Figure 5:
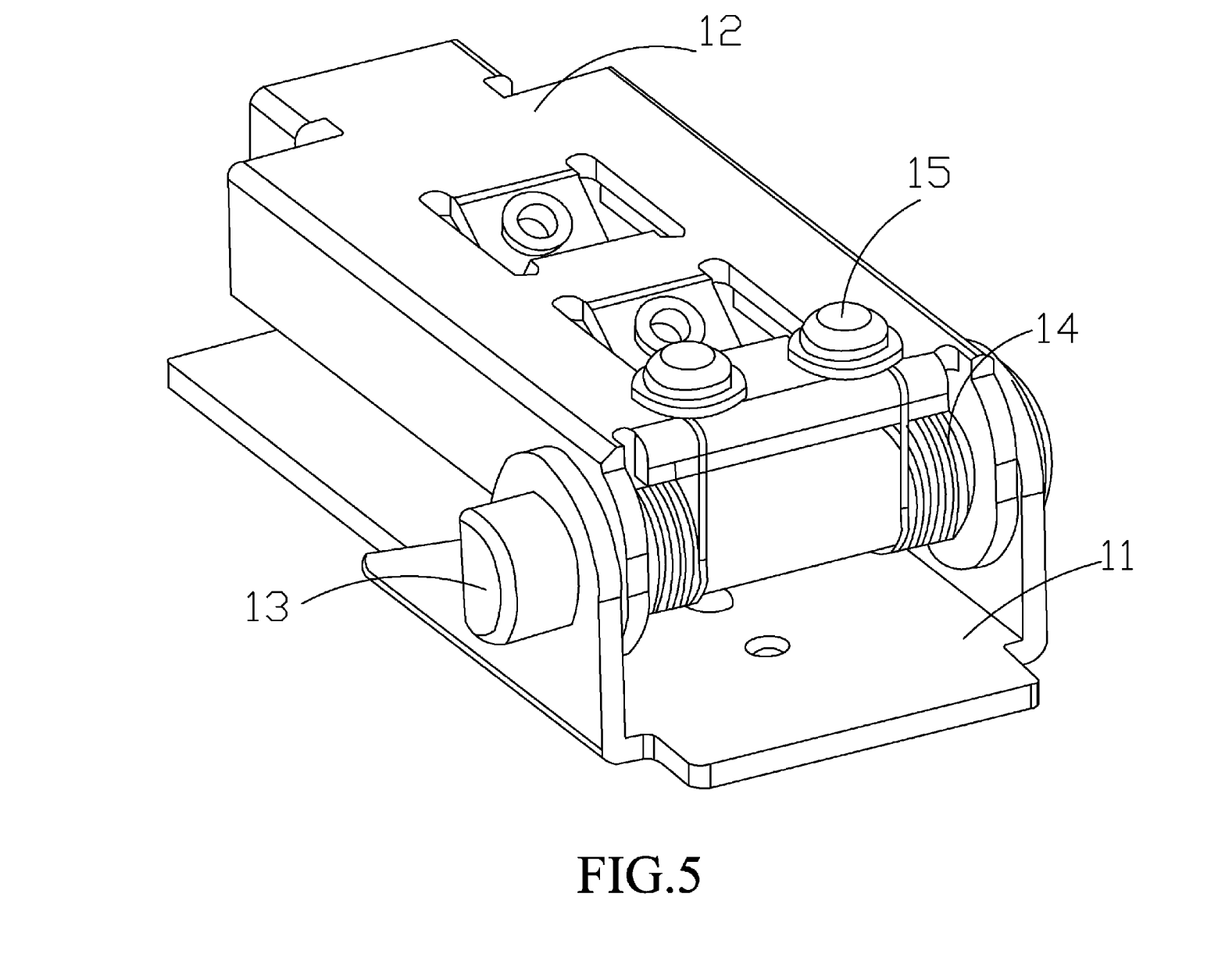
FIG. 5 is a schematic view, showing a support mechanism in a close state of a second preferred embodiment according to the present invention.

Please refer to FIG. 5. FIG. 5 is a schematic view showing a support mechanism in a closing state of a second preferred embodiment according to the present invention.

A support mechanism includes a plurality of torsional force generating devices 14. A right end of one of the torsional force generating device 14 is wound to form a loop portion 141 used for putting around the locking element to allow one end of the torsional force generating device 14 to be fixed on the plate, and A left end of another torsional force generating device 14 is then wound to form the loop portion 141 used for putting around the locking element.

Figure 6:
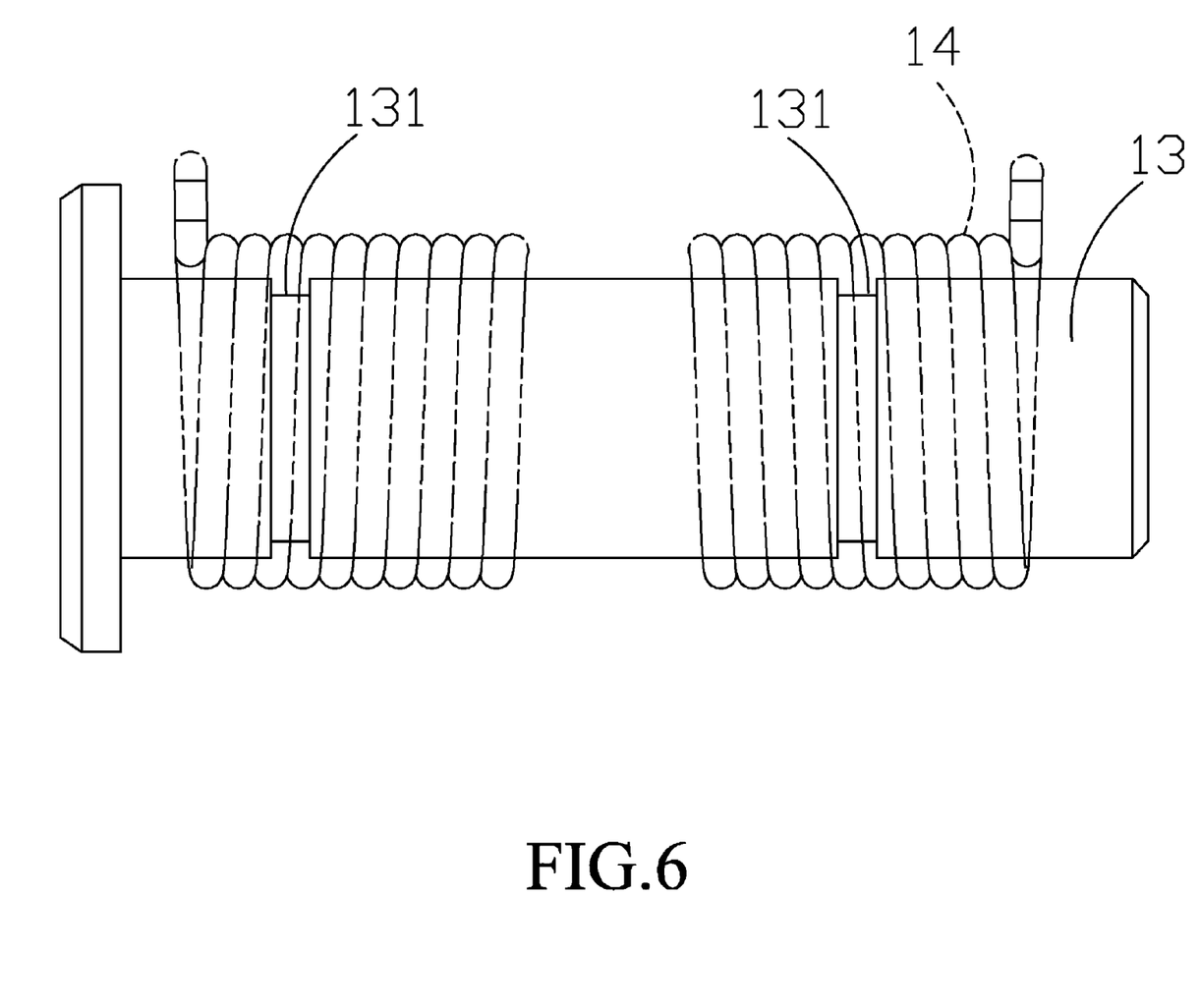
FIG. 6 is a perspective view, showing a transmission shaft of a third preferred embodiment according to the present invention.

Please refer to FIG. 6. FIG. 6 is a perspective view showing a transmission shaft in a support mechanism of a third preferred embodiment according to the present invention.

A transmission shaft 13 of a support mechanism 1 includes at least one groove 131, in which the width of the groove 131 is smaller than a torsional force generating device 14. A part of the torsional force generating device 14 is wound around the groove 131 and other parts thereof are wound around a transmission shaft 13. When a user fixes an upper body of an electronic device to a tenon or clasp, the torsional force generating device 14 is bound up in the groove 131 such that a reserved stress is yielded. Therefore, when the user separates the upper body of the electronic device from the tenon or the clasp, the torsional force generating device 14 wound around the groove 131 releases the preserved stress to allow a spring force capable of being separated from the tenon or the clasp to be yielded when the plate 12 is turned pivotally upward.

Figure 7:
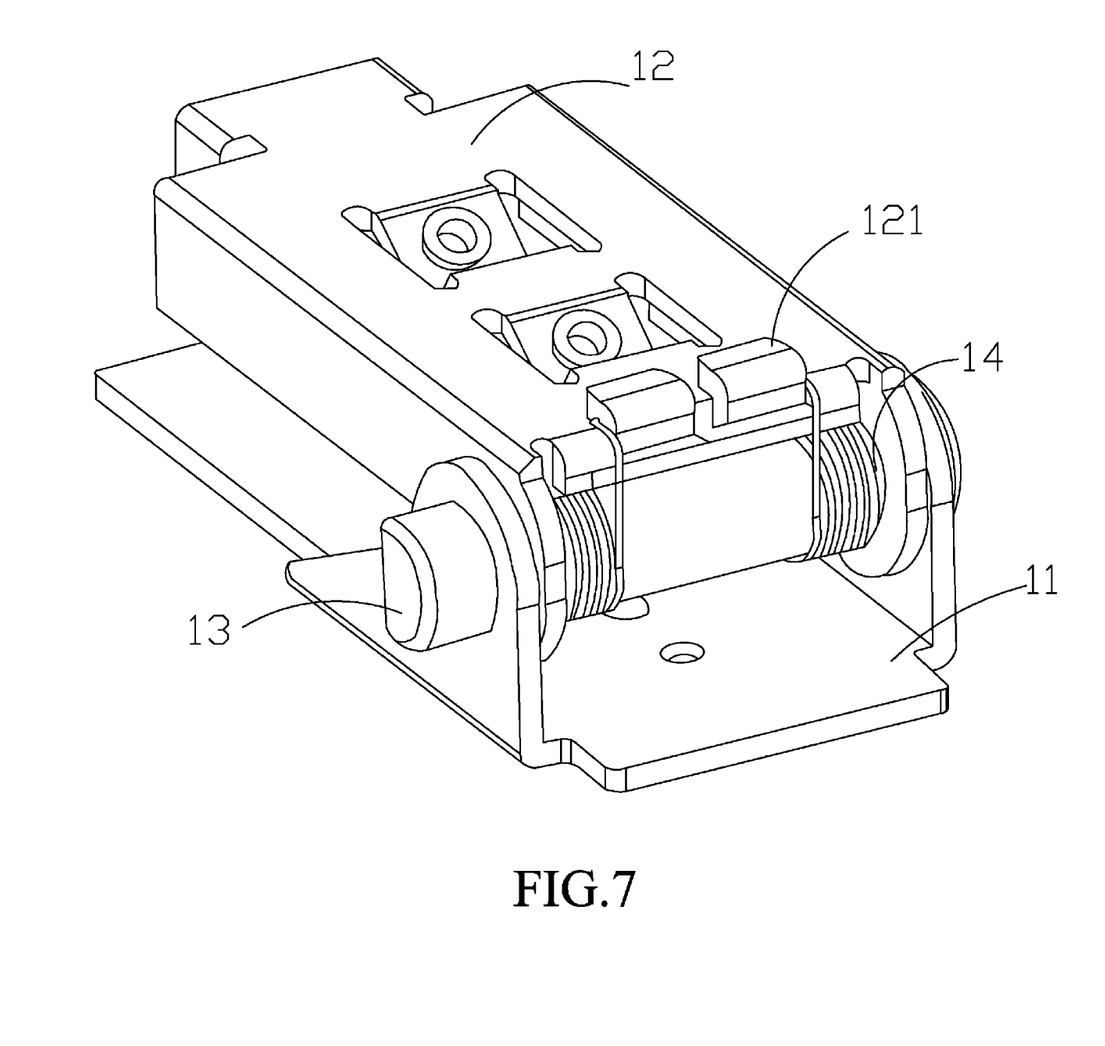
FIG. 7 is a schematic view, showing a support mechanism in a close state of a fourth preferred embodiment according to the present invention.

Please refer to FIG. 7. FIG. 7 is a schematic view showing a support mechanism in a close state of a fourth preferred embodiment according to the present invention.

A plate 12 of a support mechanism 12 includes a positioning portion 121, and one end of a torsional force generating device 14 is wound to form a loop portion 141 used for putting around the positioning portion 121 to allow one end of the torsional force generating device 14 to be fixed on the plate so as to support an upper body of an electronic device by means of a torsional force generated from the torsional force generating device 14 to enable the upper body of the electronic device to be stopped at any angle or descend slowly.

Besides, a through hole can be disposed on the plate 12 so as to allow one end of the torsional force generating device 14 to be passed through the through hole and then wound around and fixed on the plate 12.

Figure 8:
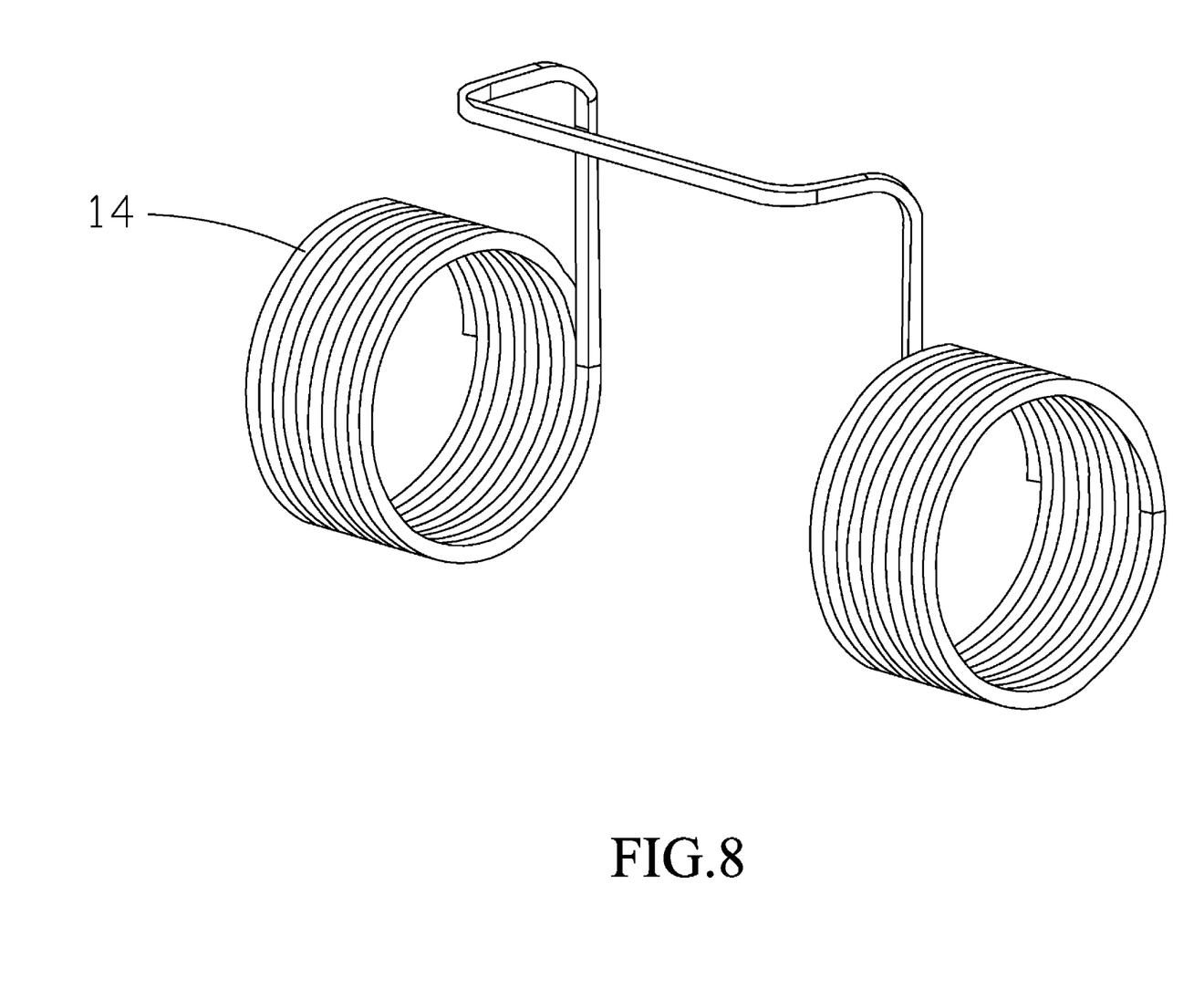
FIG. 8 is a perspective view, showing a torsional force generating device of a fifth preferred embodiment according to the present invention.
Figure 9:
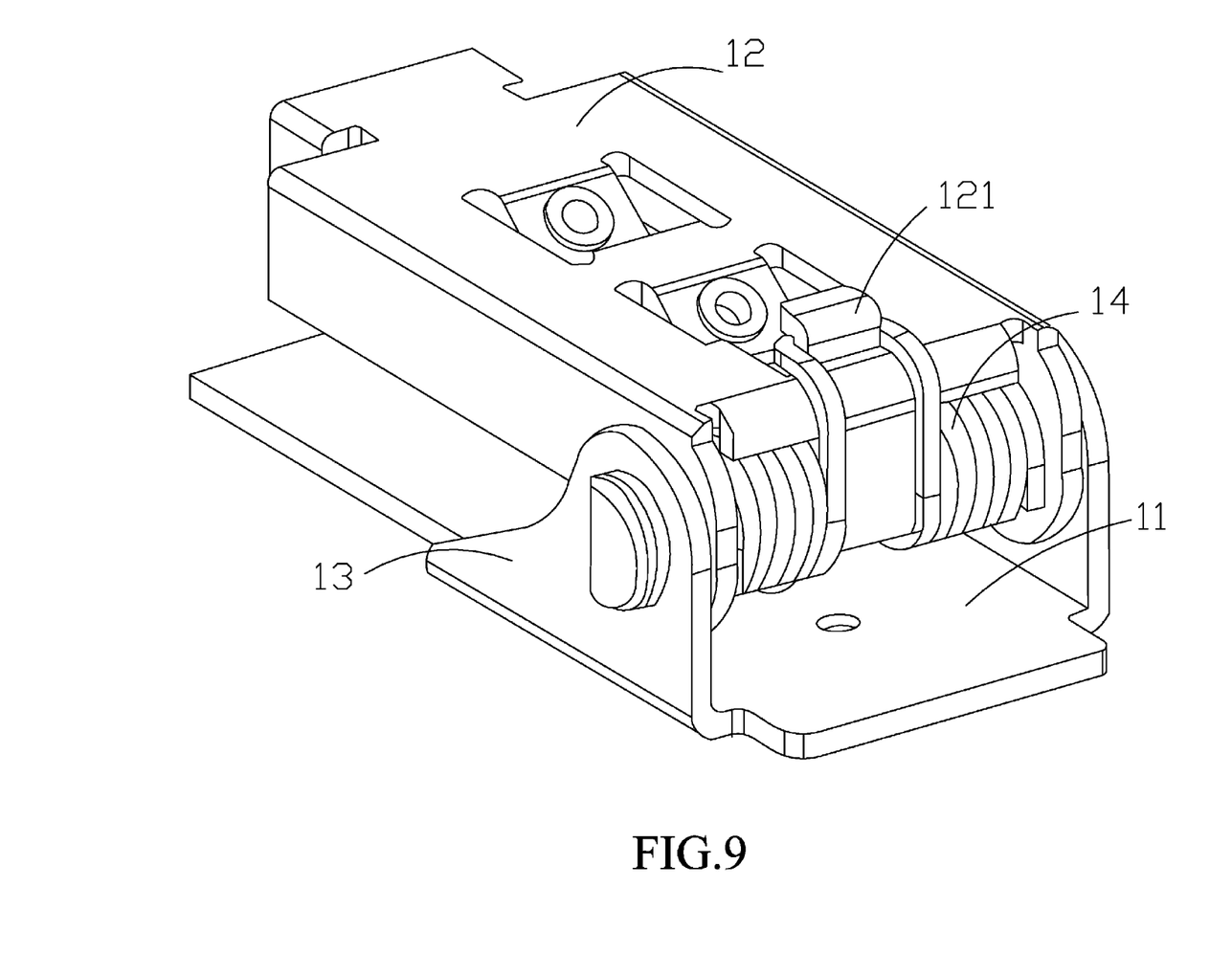
FIG. 9 is a schematic view, showing a support mechanism in a close state of a fifth preferred embodiment according to the present invention.

Please refer to FIGS. 9 and 8. FIG. 8 is a perspective view showing a torsional force generating device of a fifth preferred embodiment according to the present invention. FIG. 9 is a schematic view showing a support mechanism in a close state of a fifth preferred embodiment according to the present invention.

Two sides of a torsional force generating device 14 are respectively wound around a transmission shaft 13 and a middle portion thereof is extended outward to wind around a positioning portion 121 in the present embodiment. Therefore, the torsional force generating device 14 is allowed to fix on a plate 12 so as to support an upper body of an electronic device by means of a torsional force generated from the torsional generating device 14 to enable the upper body of the electronic device to be stopped at any angle or descend slowly.

According to the preferred embodiments of the present invention mentioned above, the torsional force generating devices 14 listed above are all springs, but this does not mean that the torsional force generating device according to the present invention is not merely a spring, it is hereby described.

That a forward acting force is taken as a reverse torsional force supporting an upper body of an electronic device in a structure disclosed by the present invention allows the upper body of the electronic device to be stopped at any angle or descend slowly. Whereby, the number of components needed for the support mechanism can be reduced. Not only space occupied by the support mechanism can be reduced, but also the convenience of assembly can be elevated, and the production cost can further be attained. Furthermore, the structure disclosed in the present invention can also be use on a larger-loaded upper body so as to solve the problem that the insufficient supporting torsional force of a conventional mechanism causes the dropping of the upper body.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A support mechanism, adapted to an upper body of an electronic device, said upper body being capable of being turned pivotally relative to a lower body of said electronic device, said support mechanism comprising:
    a base, fixable on the lower body;
    a plate, fixable on the upper body;
    a transmission shaft, passed through and installed on said base and used for coupling said base to said plate to allow said plate to be turned pivotally relatively to said base, the transmission shaft having a groove formed thereon; and
    a torsional force generating device wound around said transmission shaft and said groove, one end thereof being extended outward and fixed on said plate, the other end thereof being unfixed and movable around the transmission shaft, the torsional force generating device having a width, along an axis of the transmission shaft, that is larger than a width of the groove, so as to reserve stress when a portion of the torsional force generating device is bound up in the groove;
    wherein, after said plate is turned pivotally upward, the weight of the upper body allows an inner side of said torsional force generating device to bind up said transmission shaft to generate a torsional force so as to support the upper body of the electronic device.

2. The support mechanism according to claim 1, wherein said plate comprises at least one positioning portion used for allowing one end of said torsional force generating device to be wound around to fix on said plate.

3. The support mechanism according to claim 2, wherein one end of said torsional force generating device is wound to form a loop portion used for putting around said positioning portion of said plate.

4. The support mechanism according to claim 1, wherein said plate comprises at least one through hole used for allowing one end of said torsional force generating device to be passed through and wound around to fix on said plate.

5. The support mechanism according to claim 1, further comprising at least one locking element fixed on said plate to allow one end of said torsional force generating device to be wound around.

6. The support mechanism according to claim 5, wherein one end of said torsional force generating device is wound to form a loop portion used for putting around said locking element.

7. The support mechanism according to claim 1, wherein said plate is pivotally turnable upward to allow an inner side of said torsional force generating device to loose said transmission shaft.

8. The support mechanism according to claim 1, wherein said torsional force generating device is a spring.

9. A support mechanism, adapted to an upper body of an electronic device, said upper body being capable of being turned pivotally relative to a lower body of said electronic device, said support mechanism comprising:
   a base, fixable on the lower body;
   a plate, fixable on the upper body;
   a transmission shaft, passed through and installed on said base and used for coupling said base to said plate to allow said plate to be turned pivotally relatively to said base, the transmission shaft having a groove formed thereon; and
   a torsional force generating device, two sides thereof being respectively wound around said transmission shaft to thereby form two winding portions, a middle portion thereof being extended outward to fix on said plate, two ends thereof being unfixed and movable around the transmission shaft, one of the winding portions being wound around the groove, and having a width, along an axis of the transmission shaft, that is larger than a width of the groove, so as to reserve stress when a portion of the one winding portion is bound up in the groove;
   wherein, after said plate is turned pivotally upward, the weight of the upper body allows an inner side of said torsional force generating device to bind up said transmission shaft to generate a torsional force so as to support the upper body of the electronic device.

10. The support mechanism according to claim 9, wherein said plate comprises at least one positioning portion used for allowing one end of said torsional force generating device to be wound around to fix on said plate.

11. The support mechanism according to claim 9, further comprising at least one locking element fixed on said plate to allow one end of said torsional force generating device to be wound around.

12. The support mechanism according to claim 9, wherein said plate is pivotally turnable upward to allow an inner side of said torsional force generating device to loose said transmission shaft.

13. The support mechanism according to claim 9, wherein said torsional force generating device is a spring.

14. The support mechanism of claim 1, wherein the plate includes two vertical projections, and the transmission shaft is horizontally installed between the two vertical projections.

15. The support mechanism of claim 9, wherein the plate includes two vertical projections, and the transmission shaft is horizontally installed between the two vertical projections.

16. The support mechanism of claim 1, wherein the other end of the torsional force generating device lays against the transmission shaft.

17. The support mechanism of claim 9, wherein the other end of the torsional force generating device lays against the transmission shaft.

18. The support mechanism of claim 1, wherein the base has a first surface, and the plate has a second surface facing the first surface.

19. The support mechanism of claim 9, wherein the base has a first surface, and the plate has a second surface facing the first surface.

* * * * *